United States Patent [19]

Krueger

[11] 4,388,583

[45] Jun. 14, 1983

[54] BATTERY CHARGER WITH TRANSDUCER FOR CONTROLLING CHARGE RATE

[75] Inventor: William R. Krueger, Hartford, Wis.

[73] Assignee: Outboard Marine Corporation, Waukegan, Ill.

[21] Appl. No.: 241,135

[22] Filed: Mar. 6, 1981

[51] Int. Cl.³ .............................................. H02J 7/00
[52] U.S. Cl. ...................................... 320/46; 320/48; 31/311; 320/35; 324/425
[58] Field of Search ................. 324/425, 432; 310/338, 310/337, 311; 320/35, 19, 36, 39, 46, 48, 37, 38

[56] References Cited

U.S. PATENT DOCUMENTS

| | | | |
|---|---|---|---|
| 2,514,235 | 7/1950 | Genin et al. | 320/46 X |
| 2,571,899 | 10/1951 | Kroft et al. | 310/338 X |
| 3,123,758 | 3/1964 | Giacalone | 320/46 X |
| 3,798,528 | 3/1974 | Molyneux | 320/46 |
| 3,855,516 | 12/1974 | Fairchild | 320/37 X |
| 4,016,473 | 4/1977 | Newman | 320/35 X |
| 4,031,451 | 6/1977 | Gordon | 320/39 X |
| 4,240,747 | 12/1980 | Harmer | 320/48 X |

*Primary Examiner*—R. J. Hickey
*Attorney, Agent, or Firm*—Michael, Best & Friedrich

[57] ABSTRACT

Disclosed herein is an apparatus for charging a battery including a case containing at least one cell formed of a pair of electrodes immersed in an electrolyte. The apparatus includes a transducer associated with the battery and operable without sensing gas pressure in the battery case for providing a variable signal output in response to electrolyte gassing within the battery case. The apparatus also includes a control circuit arrangement coupled to the signal output for providing a variable control output in response to the signal output, and a battery charger connected to the battery electrodes and operable for charging the battery at a rate subject to the variable control output. In one embodiment of the invention, the transducer is a sound transducer, preferably a ceramic microphone, which provides a variable signal output in response to sound generated within the battery case. In another embodiment, the transducer is a fluid vibration transducer, preferably utilizing a piezoelectric element, which provides a variable signal output in response to fluid vibration in the battery electrolyte. In another embodiment, the battery charger includes a battery temperature detector, preferably utilizing a thermistor, which prevents the battery charger from charging the battery when the temperature of the battery electrolyte exceeds a predetermined upper limit or electrolyte level is low.

37 Claims, 9 Drawing Figures

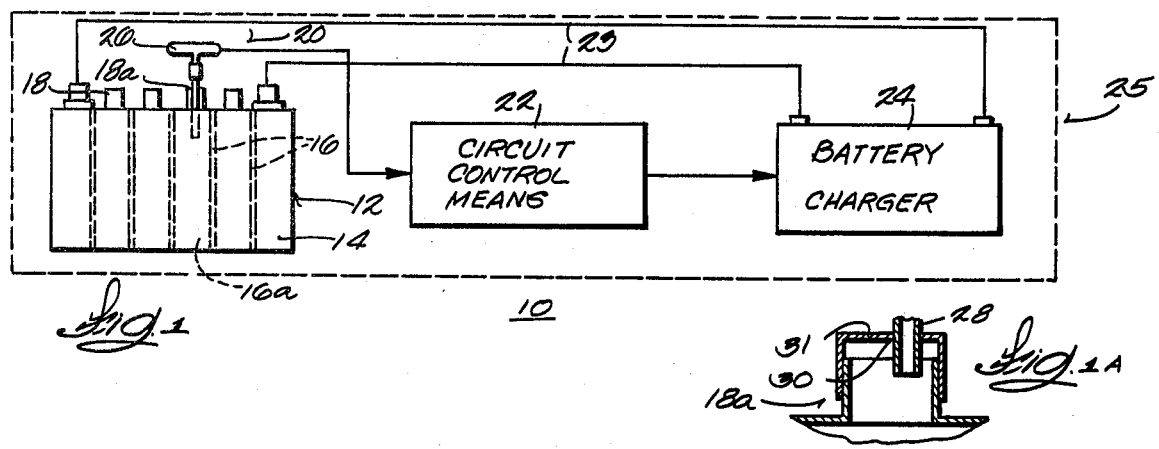
Fig. 1
Fig. 1A
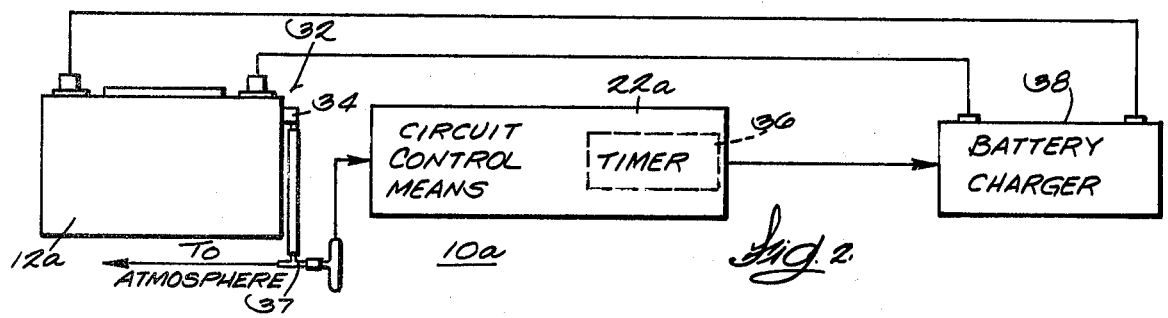
Fig. 2
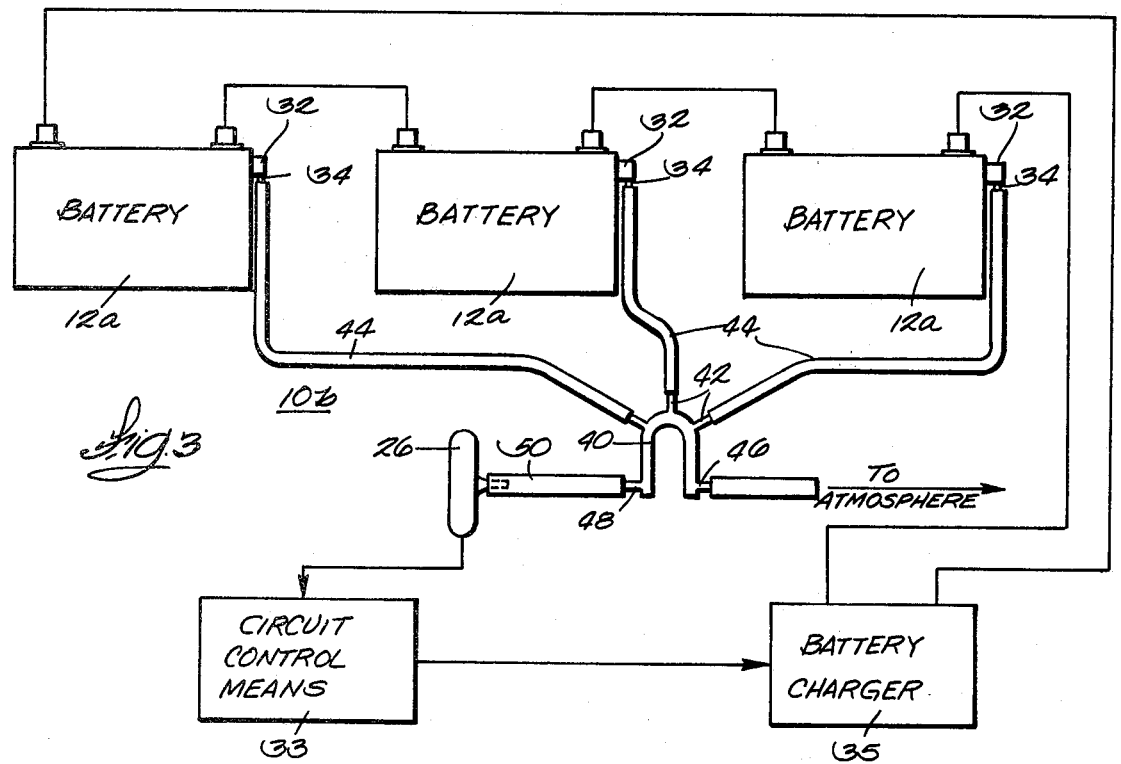
Fig. 3

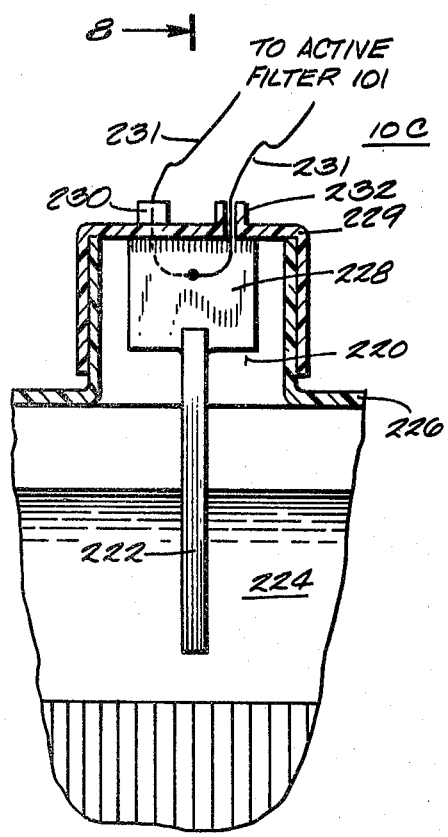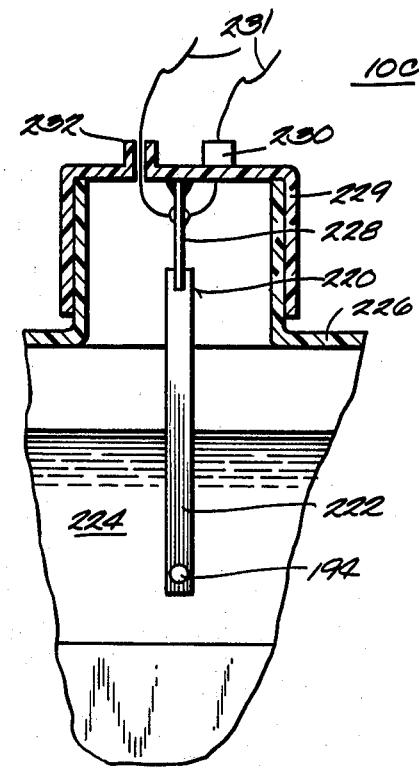
Fig. 7
Fig. 8

BATTERY CHARGER WITH TRANSDUCER FOR CONTROLLING CHARGE RATE

BACKGROUND OF THE INVENTION

The invention relates to battery chargers, and more particularly, to battery chargers including means for controlling the charging rate of a battery in response to electrolyte gassing in the battery.

Heretofore, some battery chargers have operated by sensing the voltage at the battery terminals. Full charging occurred until a predetermined battery terminal voltage was sensed, and then the charger would turn off or switch to a trickle charge state. In some battery charger arrangements, after the predetermined battery terminal voltage was sensed, a timer would be activated to continue full charging for a predetermined period of time and then switch to a trickle charge state. Several variables affect battery terminal voltage, and thus the battery charging process, for example, battery age and temperature, the battery state of charge, line voltage, and battery discharge history from the charging process. These variables make satisfactory battery charging based upon sensing battery terminal voltage difficult to achieve.

Prior battery chargers, including chargers which are regulated by sensing gas pressure in the battery, are disclosed in the following U.S. Pat. Nos.:
Mas 3,460,019 issued Aug. 5, 1969
Mas 3,281,640 issued Oct. 25, 1966
Molyneux 3,798,728 issued Mar. 19, 1974
Sulger 3,781,751 issued Dec. 25, 1973

SUMMARY OF THE INVENTION

The invention provides an apparatus for charging a battery which is operable without sensing gas pressure in the battery, and which generally eliminates dependence on the variables of battery age and temperature, battery state of charge, line voltage, and battery discharge history from the battery charging process.

More particularly, the invention provides an apparatus for charging a battery including a case containing at least one cell formed of a pair of electrodes immersed in an electrolyte, the apparatus including transducer means associated with the battery and operable without sensing gas pressure in the battery case for providing a variable signal output in response to electrolyte gassing within the battery case, circuit control means coupled to the signal output for providing a variable control output in response to the signal output, and charging means connected to the battery electrodes and operable for charging the battery at a rate subject to the variable control output.

In accordance with an embodiment of the invention, there is provided an apparatus for charging a battery including a case containing at least one cell formed of a pair of electrodes immersed in an electrolyte, the apparatus including sound transducer means associated with the battery for providing a variable signal output in response to sound generated within the battery case, circuit control means coupled to the signal output for providing a variable control output in response to the signal output, and charging means connected to the battery electrodes and operable for charging the battery at a rate subject to the variable control output. The sound transducer means preferably comprises a ceramic microphone located in communication with the battery cell, for example, where the battery case includes a battery cap having a vent communicating with the battery cell and the ceramic microphone is secured to the battery cap.

Also in accordance with an embodiment of the invention, an apparatus is provided for charging a plurality of batteries, each battery case including a vent in communication with a battery cell, the apparatus also including manifold means for coupling a vent of each of the plurality of batteries to the sound transducer means so that the variable signal output provided by the sound transducer means is generally in response to the sound generated within the cases of all of the plurality of batteries.

In accordance with another embodiment of the invention, there is provided an apparatus for charging a battery including a case containing at least one cell formed of a pair of electrodes immersed in an electrolyte, the apparatus comprising fluid vibration transducer means associated with the battery for providing a variable signal output in response to fluid vibration in the battery electrolyte, circuit control means coupled to the signal output for providing a variable control output in response to said signal output, and charging means connected to the battery electrodes and coupled to the control output for supplying charging current to the battery subject to the control output. The fluid vibration transducer means preferably comprises a piezo-electric element and probe means connected to the piezo-electric element and extending into the battery electrolyte for imparting a mechanical stress on the piezo-electric element when the electrolyte gasses and bubbles as a result of battery charging.

Also in accordance with an embodiment of the invention, there is provided an apparatus wherein the charging means includes battery temperature detection means for preventing the charging means from charging the battery when the temperature of the battery electrolyte exceeds a predetermined upper limit. The battery temperature detection means preferably comprises a thermistor which is normally immersed in the battery electrolyte, and is operable when not immersed in the battery electrolyte to self-heat and prevent the charging means from charging the battery.

Also in accordance wth an embodiment of the invention, there is provided an apparatus wherein the circuit control means comprises threshold circuit means for preventing the variable control output with a magnitude below a predetermined threshold value from preventing the operation of the charging means.

Also in accordance with an embodiment of the invention, there is provided an apparatus wherein the circuit control means comprises active filter means coupled to the variable signal output and for providing a filtered output having a predetermined frequency band which generally corresponds to the central frequencies of the output of the fluid vibration transducer means resulting from electrolyte gassing in response to battery charging, and detector means coupled to the filtered output and for providing the variable control output, the control output being DC and having a magnitude generally proportional to the magnitude of electrolyte gassing within the battery.

Also in accordance with an embodiment of the invention, there is provided an apparatus wherein the charging means comprises power transformer and rectifier means having a DC power output, pulse shaper means coupled to the DC power output, ramp generator means coupled to the pulse shaper means, comparator means having two inputs, with one input coupled to the variable control output and the other input coupled to the ramp generator means, and having an output, and switch means subject to the comparator output for connecting the DC power output to the battery electrodes to effect charging of the battery.

Also in accordance with an embodiment of the invention, there is provided an apparatus wherein the charging means comprises phase control means for charging the battery at a decreasing rate in response to the magnitude of said variable control output increasing. The phase control means preferably includes terminals adapted for connection to the battery and is operable for preventing a voltage from appearing across the terminals when the battery is not connected to the terminals.

One of the principal features of the invention is the provision of an apparatus for charging a battery which generally eliminates dependence on the variables of battery age and temperature, battery state of charge, line voltage, and battery discharge history for the battery charging process.

Another of the principal features of the invention is the provision of such an apparatus including transducer means operable without sensing gas pressure in the battery for providing a variable signal output in response to electrolyte gassing within the battery case, the variable signal output being processed to provide a variable control output which regulates the rate at which the battery is charged by charging means included in the apparatus.

Another of the principal featues of the invention is the provision of the transducer means comprising sound transducer means located in communication with a battery cell formed of a pair of electrodes immersed in an electrolyte contained within the battery case.

Another of the principal features of the invention is the provision of such an apparatus for charging a plurality of batteries, wherein each battery case including a vent in communication with a battery cell, the apparatus also including manifold means for coupling a vent of each of the batteries to the sound transducer means so that the variable signal output provided by the sound transducer means is generated in response to the sound generated within the cases of all of the plurality of batteries.

Another of the principal features of the invention is the provision of such an apparatus wherein the transducer means comprises fluid vibration transducer means, preferably comprising a piezo-electric element and probe means connected to the piezo-electric element and extending into the battery electrolyte for imparting mechanical stress on the piezo-electric element when the electrolyte gasses and bubbles as a result of battery charging.

Another of the principal features of the invention is the provision of such an apparatus wherein the charging means includes battery temperature detection means for preventing the apparatus charging means from charging the battery when the temperature of the battery electrolyte exceeds a predetermined upper limit.

Another of the principal features of the invention is the provision of the battery temperature detection means preferably comprising a thermistor which is normally immersed in the battery electrolyte, and which is operable when not immersed in the battery electrolyte to self-heat and prevent the charging means from charging the battery.

Another of the principal features of the invention is the provision of such an apparatus including circuit control means which includes threshold circuit means for preventing a variable control output with a magnitude below a predetermined threshold value from preventing the operation of the charging means.

Other features and advantages of the embodiments of the invention will become known by reference to the following drawings, general description and claims.

DRAWINGS

FIG. 1 is a diagrammatic view of a battery charging apparatus which embodies various of the features of the invention.

FIG. 1a is an enlarged sectional view of a portion of the battery shown in FIG. 1.

FIG. 2 is a diagrammatic view of an alternative battery charging apparatus which embodies various of the features of the invention.

FIG. 3 is a diagrammatic view of an alternative battery charging apparatus for a plurality of batteries and which embodies various of the features of the invention.

FIG. 7 is a diagrammatic and sectional view of a portion of a battery charging apparatus which includes a fluid vibration transducer and which embodies various of the features of the invention.

FIG. 8 is a view taken along lines 8—8 in FIG. 7.

Figure 4:
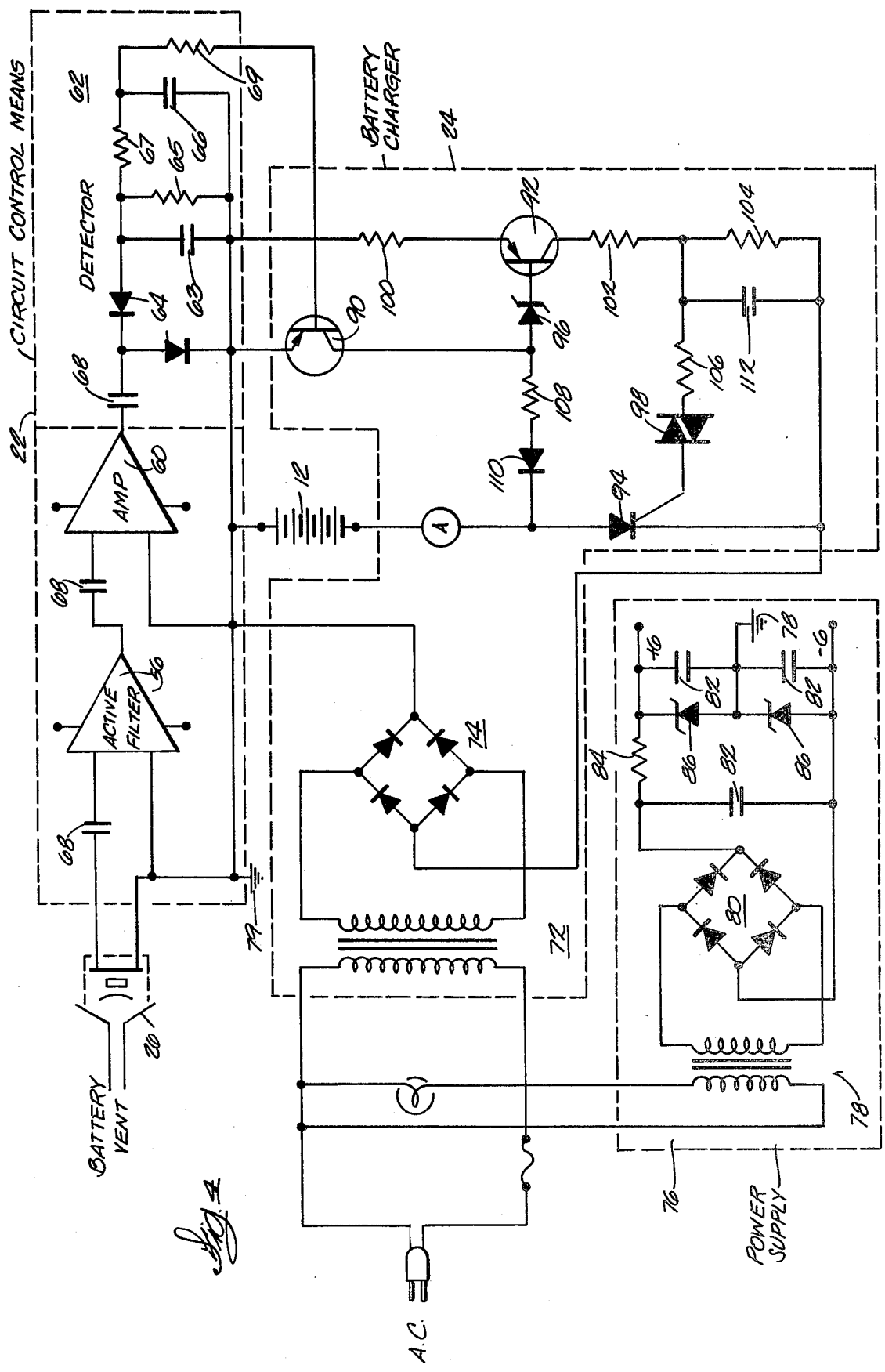
FIG. 4 is a schematic diagram of the circuitry of the circuit control means and charger included in the battery charging apparatus of FIGS. 1 and 3, and which embodies various of the features of the invention.

Before explaining the embodiments of the invention in detail, it is to be understood that the invention is not limited in its application to the details of construction and the arrangement of the compnents set forth in the following description or illustrated in the drawings. The invention is capable of other embodiments and of being practiced and carried out in various ways. Also, it is to be understood that the phraseology and terminology employed herein is for the purpose of description and should not be regarded as limiting.

GENERAL DESCRIPTION

Shown diagrammatically in FIG. 1 is a battery charging apparatus, generally designated 10, for charging one or more batteries 12, each including a case 14 containing at least one cell formed of a pair of electrodes immersed in an electrolyte. While various types of wet-cell batteries could be charged, the battery 12 illustrated is a standard 12 volt auto battery with vented cells 16 covered by battery caps 18 and 18a.

The apparatus 10 includes sound transducer means, generally designated 20, which provides a variable signal output in response to the sound of the battery electrolyte bubbling or gassing during charging of the battery. Circuit control means, generally designated 22, is coupled to the signal output of the sound transducer means and is operable for providing a variable control output which is coupled to charging means or a battery charger, generally designated 24. The battery charger 24 is connected to the electrodes of battery 12 by lines 23 and is operable for charging the battery at a rate subject to the variable control output of the circuit control means 22.

More particularly, while various sound transducer means arrangements could be utilized, the sound transducer means 20 preferably comprises a ceramic microphone designated 26 and having a shape similar to an earphone. The microphone 26 is preferably connected to communicate with the battery cell designated 16a by a conduit 28 which extends from the microphone 26 through an aperture 30 of battery cap 18a (see FIG. 1a). The battery cap 18a also preferably includes a separate aperture 31 so that the battery cell 16a remains vented to atmosphere. Thus, the ceramic microphone 26 senses sound associated with electrolyte bubbling or gassing in the battery cell 16a while cell 16a remains vented to atmosphere.

It is well known that electrolyte bubbling or gassing occurs during battery charging when current fed to the battery breaks down the water in the electrolyte into oxygen and hydrogen gas. Generally, such gassing does not occur until the battery has reached a nearly fully charged state. As will be described in connection with the circuitry illustrated in FIG. 4, when the sound transducer means or ceramic microphone 26 senses the sound associated with electrolyte gassing, the control output of the circuit control means 22 regulates the battery charger 24 so that the charging rate or power supplied to the battery decreases, thereby decreasing the battery gassing until an equilibrium is achieved where a trickle charge is supplied to the battery in response to the microphone 26 detecting a low level or the onset of electrolyte gassing.

Shown diagrammatically in FIG. 2 is an alternative charging apparatus, designated 10a, for charging a battery 12a which includes a side vent 32 in communication with all of the cells of the battery. Such a side vent 32, which includes a tube 34, is conventionally provided on relatively small batteries such as are utilized, for example, with motorcycles or electric lawn mowers. Also, a T-shaped conduit 37 couples the battery vent 32 to the microphone 14 and to atmosphere as shown.

Figure 6:
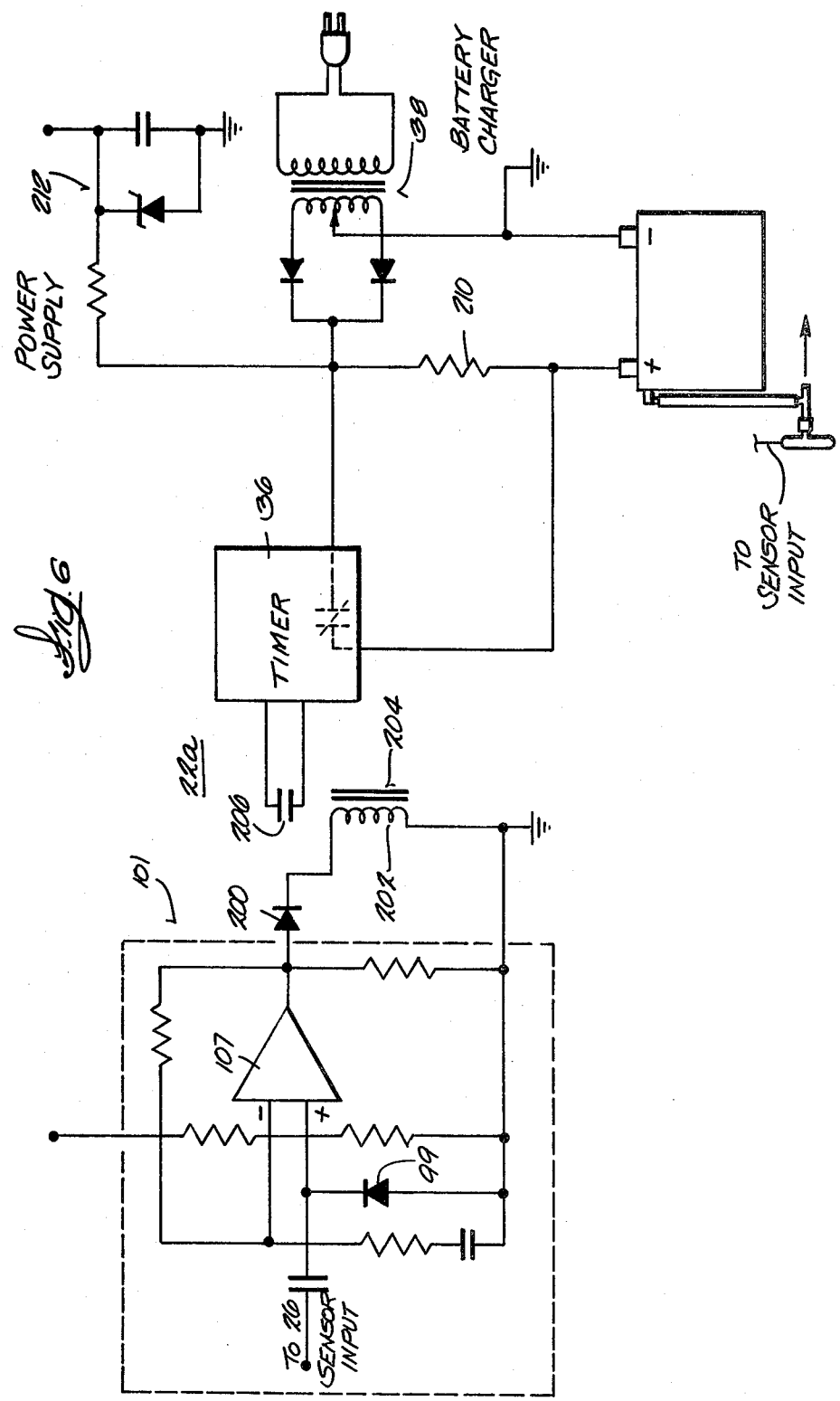
FIG. 6 is a schematic and diagrammatic view of the circuitry of the circuit control means and charger included in the battery charging apparatus of FIG. 2, and which embodies various features of the invention.

Charging apparatus 10a differs from charging apparatus 10 of FIG. 1 in that the circuit control means 22a includes a timer 36 and a different charging means or battery charger, designated 38 (see FIG. 6). As will be described below in connection with the circuitry of FIG. 6, when the onset of gassing is detected by the microphone 26, the timer 36 is activated and allows the battery charger to continue to charge at a full rate for a predetermined time. Thereafter, the timer 36 provides an output which causes the battery charger to switch to a trickle charge mode of operation.

Shown in FIG. 3 is another alternative charging apparatus, generally designated 10b, which is particularly adapted for charging a plurality of batteries 12a, each battery 12a having a side vent 32 including a tube 34 as described above. The apparatus 10b includes manifold means, preferably in the form of a U-shaped member 40 which has outlets 42 respectively coupled by conduits 44 to tubes 34 of the battery vents 32, and also includes an outlet 46 vented to atmosphere and an outlet 48 coupled to a microphone 26 by conduit 50. The microphone 26 is in communication with the cells of each of the batteries 12a, and thus senses the sound of electrolyte gassing in all of the batteries 12a. The apparatus 10b includes circuit control means, designated 33, and charging means or a charger, designated 35, which has circuitry (see FIG. 5) which differs from the circuitry of the circuit control means and charger shown in FIG. 1, but provides a similar charging operation. Hence, as will be described in more detail below, the battery charger 35 charges the batteries 12a at a rate subject to a control output provided by circuit control means 33 in response to the variable signal output of the microphone 26 which senses the sound of electrolyte gassing in all of the batteries 12a.

Shown in FIG. 4 is a schematic diagram which illustrates the circuit details of the circuit control means 22 and battery charger 24. The sound transducer means or microphone 26 is diagrammatically illustrated in communication with a battery vent. A single battery 12 is shown under charge, although it is to be understood that if desired, a plurality of batteries could be connected in series and charged.

As illustrated, the circuit control means 22 preferably comprises active filter means or an active filter 56 (diagrammatically shown) having inputs coupled to receive the variable signal output of the microphone 26 and which is tuned to provide a filtered output having a predetermined frequency band width, e.g., 300–500 hertz, which has a center frequency which generally corresponds to the center frequency of the sound of the battery electrolyte gassing in response to battery charging.

The control means 22 also preferably includes amplifier means or an amplifier 60 which amplifies the filtered output and has an output connected to detector means or a diode detector, generally designated 62. The active filter 56, the amplifier 60, and detector 62 are all capacitively coupled by three capacitors 68 as illustrated to block DC components. Also, the active filter 56 and amplifier 60 can each be made up of a suitably connected operational amplifier having dual power supplies and can be, for example, a part of a single integrated circuit component.

The detector means 62 is preferably made up of a pair of diodes 64 connected to the output of amplifier 60 and arranged so that the filtered output is rectified and appears as a DC signal or control output across capacitor 66. The DC control output, which has a magnitude generally proportional to the level of sound of battery gassing within the battery, drives the charging means or charger 24 which, as illustrated, preferably comprises an SCR phase type voltage controlled charger. In order to insure that the DC control output follows variations in levels of sound or variations in battery gassing, detector 62 includes capacitor 63 and resistor 65 sized to bleed off capacitor 66 of the detector. The detector also includes a resistor 67 connected as shown, and a relatively high value resistor 69 connected to the charger 24 to prevent the charger 24 from loading down the detector.

Before further describing the structure and operation of the charging means or charger 24, it should be noted that the battery 12 and associated circuitry can be put in a box or an acoustically damped enclosure 25 (shown by dotted line in FIG. 1) to prevent ambient outside sound from interferring with the charging apparatus. Also, tuning of the active filter 56 to have a relatively narrow bandwidth, e.g., 400 Hz, with a center frequency corresponding to the center frequency of the sound of gassing helps to minimize outside interference on the operation of the apparatus.

As illustrated, the charger 24 conventionally includes a power tranformer 72 connected to a main AC line and connected to a full wave bridge rectifier 74 to provide, for example, 120 cycle pulsating DC utilized for charging the battery 12. Also, a power supply, generally designated 76, including a transformer 78, full wave recitifier 80, capacitors 82, resistor 84, and zener diodes 86, all connected as shown, is coupled to the AC line to provide a regulated power supply for the active filter 56 and amplifier 60. For example, plus and minus 6 volts DC is provided relative to a common point of connection, designated 79.

As illustrated, the SCR phase control charger 24 also preferably includes a Darlington transistor 90, transistor 92, an SCR 94, zener diode 96, and a diac 98. These components are interconnected by resistors 100, 102, 104, 106 and 108, and by a diode 110 and capacitor 112 as illustrated. The single battery 12, or plurality of batteries (not shown) are connected in series relation with the SCR 94 across the output of the full wave rectifying bridge 74.

The operation of the charging apparatus shown in FIG. 4 is as follows. Assuming that a battery in a low state of charge is connected to the charger 24, initially the battery will begin to charge and there will be no gassing. Accordingly, the variable signal output from the microphone 26 will be zero, and consequently, the control output signal appearing across capacitor 66 of detector 62 will also be zero. Thus, the charger 24 will charge the battery at a full charge rate.

More particularly, assume that the battery or series of batteries connected to the charging apparatus normally has a voltage, for example, of 36 volts DC. The emitter-base path of transistor 92 conducts so that zener diode 96, having a breakdown voltage, for example, of 18 volts, breaks down to supply base current to transistor 92 which is turned on. When transistor 92 turns on a voltage is impressed across and triggers diac 78 so that a gating signal is applied to the gate of SCR 94. The pulsating DC voltage provided by the full wave rectifier 74, for example, 50 volts rms, has a voltage value which exceeds the voltage of the battery under charge, during most of its cycle, thereby positively biasing the anode of the SCR so that, assuming the microphone signal is zero and that a gate signal is applied to the SCR, a maximum amount of power is supplied to the battery. Thus, when there is no battery gassing, the charging apparatus charges the battery at a full rate as described. The full rate charging continues until the battery is nearly fully charged, at which point battery gassing occurs and is detected by the microphone 26.

When the microphone 26 senses the sound of battery electrolyte gassing, the DC control voltage across capacitor 66 of the detector renders the Darlington transistor 90 conductive to convey positive battery voltage to the anode of the zener diode 96 so that the battery voltage conveyed to the cathode of zener diode 96 by the emitter-base of the transistor 92 is off-set and the zener diode is no longer broken down, at which point the base current is cut off and transistor 92 turns off. When transistor 92 turns off the SCR 94 is no longer gated and the battery cannot be charged.

Generally, as the magnitude of the variable signal output of the microphone 26 increases in response to the increase in the sound of gassing, the Darlington transistor 90 is rendered conductive earlier so that the transistor 92 is allowed on for shorter periods of time during each pulsating DC cycle so that the SCR is gated for smaller portions of time during each cycle, and hence, the charging rate of the battery decreases. Eventually, an equilibrium is established since the rate of charging is decreased to the point where gassing decreases. Specifically, the charging apparatus operates so that when the onset of gassing is just detected by the microphone 26, the rate of charging is decreased to a trickle charge. In view of the above description of operation, it should be appreciated that when the battery 12 is not connected to the terminals of the charger, transistor 92 is not turned on and hence SCR 94 is not gated or conductive. Accordingly, a voltage is prevented from appearing across the charger terminals when a battery is not connected to the terminals.

Figure 5:
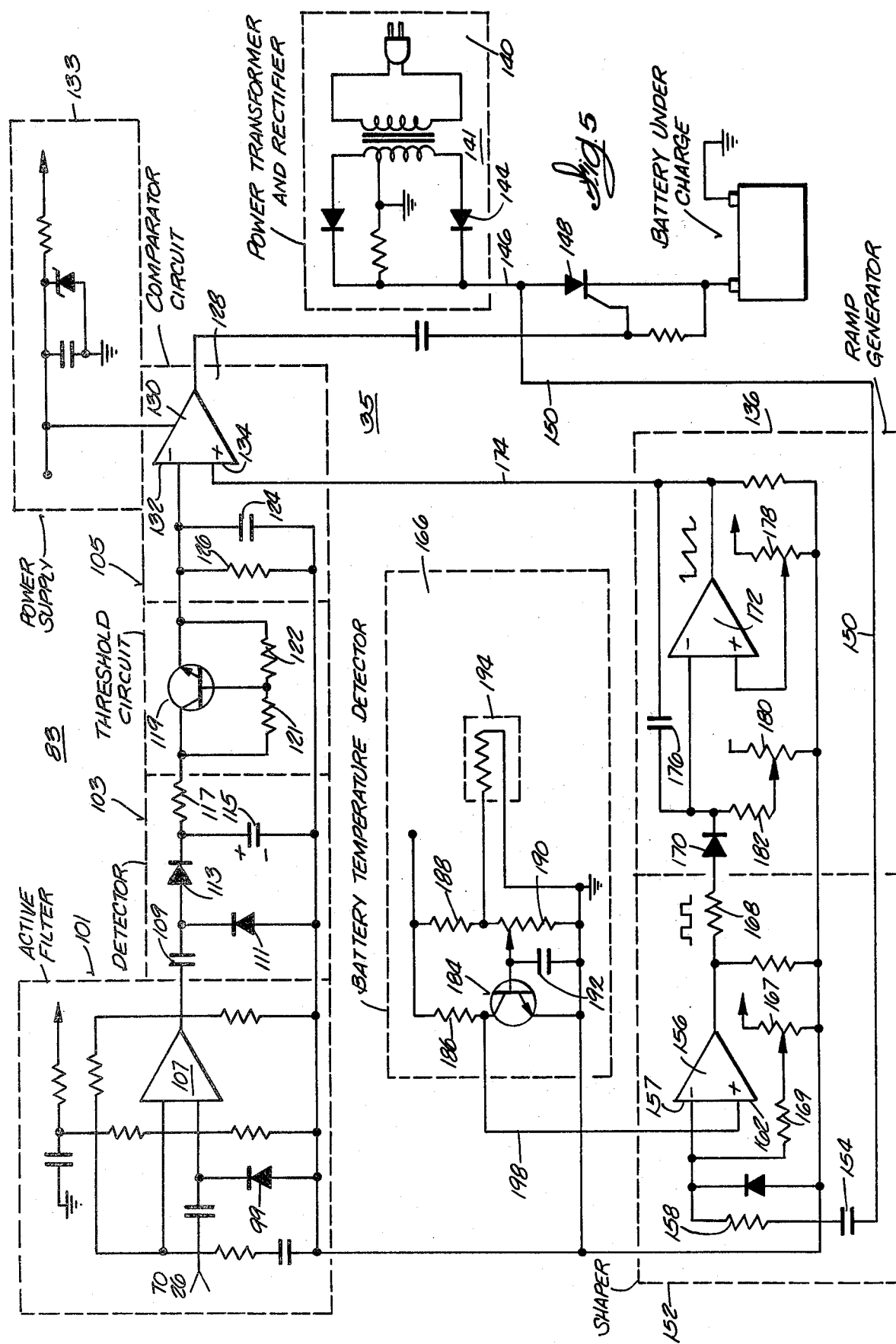
FIG. 5 is a schematic diagram similar to FIG. 4 illustrating alternative circuitry which can be included in the circuit control means and charger included in the charging apparatus of FIGS. 1 and 3.

As noted earlier FIG. 5 is a schematic diagram similar to FIG. 4 illustrating alternative circuitry which can be included in the circuit control means and charger included in the charging apparatus of FIGS. 1 and 3. More particularly, FIG. 5 is a schematic diagram which illustrates the circuit details of the circuit control means 33, and a battery charger, generally designated 35, included in the charging apparatus 10b shown in FIG. 3.

As illustrated, the circuit control means 33 is made up of an active filter, generally designated 101, a diode detector circuit, generally designated 103, and a threshold circuit, generally designated 105. The active filter 101 includes an operational amplifier 107 having an input adapted for being capacitively coupled to the output of the sound transducer or microphone 26 and includes conventionally connected resistors and capacitors (not specifically labelled) selected so that the operational amplifier (op amp) 107 provides a filtered output having a predetermined frequency bandwidth with a center frequency which generally corresponds to the center frequency of the sound of electrolyte gassing in response to battery charging. The active filter also includes a diode 99 poled as shown so that positive portions of the microphone signal within the filter bandwidth are amplified.

The diode detector 103 is capacitively coupled to the output of the active filter by capacitor 109 and includes diodes 111 and 113 arranged so that the filtered output appears as a positive DC control voltage across capacitor 115 as shown. This variable DC control output is coupled by resistor 117 to threshold means for preventing the variable control output with a magnitude below a predetermined threshold value from effecting or preventing the operation of the charging means 35. While various arrangements could be utilized, such threshold means preferably comprises a threshold circuit 105 which includes a transistor 119 biased by a resistor 121 connected between the collector and base of transistor 119 and a resistor 122 connected between the base and emitter of transistor 119. A predetermined voltage drop across resistors 121 and 122 is necessary before transistor 119 conducts, and thus, the charging means or charger 35 does not respond to small or extraneous voltages appearing across the capacitor 115 of the detector and having a magnitude less than the predetermined threshold value or voltage drop.

The output of the threshold circuit 105 is fed to the charging means 35 and more particularly, is impressed across capacitor 124 connected in parallel with resistor 126, both of which components are included in a comparator circuit, generally designated 128. The comparator circuit 128 also includes a comparator 130 having an inverting input 132 coupled to the voltage across the capacitor 124, and having a non-inverting input 134 connected to the output of a ramp generator 136, also included in the charging means 35. The ramp generator is connected to and regulated by the output of a shaper, generally designated 152. The ramp generator includes a comparator 172 and the shaper includes a comparator 156.

The comparator 130 of the comparator circuit and the comparators 156 and 172 are each made up of an operational amplifier, which together with the operational amplifier 107 of the active filter, can be included in a single integrated circuit quad-amp element, for example, Model LM324 manufactured by National Semiconductor. Each of the operational amplifiers which makes up the comparators 130, 156 and 172, operates with a single voltage source provided by a power supply 133 (see comparator 130) and is connected to operate as comparator so that if the signal at the non-inverting input is greater than the signal at the inverting input, the output of the caparator is positive, otherwise, the output of the comparator is zero.

In addition to the comparator circuit 128, the charging means includes a power transformer and rectifier, generally designated 140, and is made up of a transformer 141 which is connected to an AC line and diodes 142 and 144 which have their cathodes connected to an output line 146 so that a pulsating DC voltage appears on line 146, which line is connected to the anode of an SCR 148 and is connected to the shaper 152 by line 150.

As noted earlier, the shaper 152 includes an operational amplifier or comparator 156 having an inverting input 157 capacitively coupled to the power transformer and rectifier 140 by line 150 including a capacitor 154 and a resistor 158. The comparator 156 also has a non-inverting input 162 coupled by line 198 to the output of a battery temperature detector, generally designated 166 (described below). The shaper 152 also includes a potentiometer 167 having an output coupled through resistor 169 to the inverting input 157 of comparator 156.

The ramp generator 136, in addition to including the comparator 172, includes a potentiometer 178 having one end connected to the power supply 133 and an output connected to the non-inverting input of comparator 172, and also includes a potentiometer 180 which operates as a voltage divider and has an output or wiper connected through resistor 182 to the inverting input of comparator 172. A diode 170 is also connected to the inverting input of comparator 172 and is poled to allow only positive signals to be conveyed from the shaper to the ramp generator. The ramp generator also includes a capacitor 176 which is connected between the output and inverting input of the comparator 172 so that the comparator 172 operates as an integrator and the output is a ramp voltage.

Returning to a description of the battery temperature detector 166, transistor 184 is biased by resistors 186 and 188, and a variable resistor 190 along with capacitor 192. Specifically, the base of transistor 184 is connected to the output of potentiometer 190, which potentiometer is shunted by or connected in parallel with a thermistor 194. Assuming the resistance of thermistor 194 is high enough so that the transistor 184 is biased on, line 198 connected between the collector of transistor 184 and the positive input of operational amplifier 156 is effectively clamped to ground so that the output of the shaper is zero as previously described. If the resistance of thermistor 194 drops, in response to a low level of electrolyte in the battery or overheating of the electrolyte, (discussed below) transistor 184 is rendered less conductive or non-conductive so that the positive input of operational amplifier 156 is biased so that the duration of the positive square-wave is increased, and hence, the duration and magnitude of the ramp output of the ramp generator 136 is reduced.

As illustrated, the battery under charge is connected to the cathode of SCR 148 so that when SCR 148 is rendered conductive, the battery is charged by current supplied from the power transformer and rectifier 140. A more detailed description of the operation of the circuit control means and charging means shown in FIG. 5 is given below.

Assuming that a battery in a low state of charge is connected to charger 35, initially the battery will begin to charge at full rate and there will be substantially no gassing. Accordingly, the variable signal output of the sound transducer or microphone located to sense the sound of gassing will be negligible so that the voltage appearing across the capacitor 115 of the detector will be less than the predetermined voltage required to turn transistor 119 on in the threshold circuit 105, and consequently, the negative input 132 of comparator or operational amplifier 130 will be zero. Positive input 134 (assuming that thermister 194 does not have a low resistance indicating low electrolyte or overheating of the electrolyte) will be supplied with a ramp signal so that the comparator 130 has a positive output which gates the SCR 148.

When the SCR 148 is gated, the pulsating DC provided by the rectifier 140, during a latter portion of its cycle, exceeds the voltage of the battery under charge, for example 36 volts. Thus, the anode of the SCR 148 is positively biased, and assuming that the gate signal is applied to the SCR by the output of comparator 130, the power is supplied to the battery and the battery is charged at full rate. Thus, when there is no battery gassing, i.e., when there is no signal applied to the negative input of the comparator 130, the SCR 148 is gated and the battery charges at full rate as described. Full rate charging continues until the battery is nearly fully charged, at which point battery gassing occurs.

When the sound transducer senses gassing so that the voltage provided by the detector circuit exceeds the predetermined or threshold voltage, that voltage is supplied to the negative input 132 of comparator 130 so that the magnitude of the ramp voltage must exceed the magnitude of the threshold voltage before the output of the comparator gates the SCR, and thus allows the battery to charge. Thus, the output of the ramp generator turns on the comparator 130 for smaller portions of time during each cycle if the magnitude of the DC control voltage of the detector increases. Thus, if the detector voltage is high, i.e., it detects substantial battery gassing, the ramp signal will not exceed such signal until late in the half-cycle, or not at all, and thus, only a small amount of current will be supplied to the battery. As with the charging means in FIG. 4, the charger in FIG. 5 causes the charging rate to taper and reaches an equilibrium point. Thus, a trickle current is provided to the battery in response to the sound transducer detecting the onset of gassing.

As noted earlier, charger 35 also preferably includes the battery temperature detector 166. The thermister is biased to operate in its negative resistance range so its resistance drops as temperature increases. Thus, if the battery electrolyte temperature increases, the resistance of the thermister decreases, thereby shunting transistor 184 so that the voltage applied to the positive input of operational amplifier 156 increases, thereby reducing the duty cycle of the shaper and reducing the magnitude of the ramp output of the ramp generator so that the comparator 130 turns off (assuming a detector voltage greater than the reduced magnitude ramp voltage) thereby shutting down the charger until the temperature of the electrolyte drops.

Similarly, if the level of the electrolyte is low or the thermistor is moved so that the thermister is no longer immersed, it is biased in the temperature detector circuit so that it self-heats, again with the result that the magnitude of the ramp output is reduced or approaches zero so that the comparator 130 output is low and the SCR 148 is not gated so that battery charging is reduced or prevented.

As noted earlier, shown in FIG. 6 is a schematic and diagrammatic view of the battery charging apparatus 10a of FIG. 2. As illustrated, the circuit control means 22a includes an active filter 101, the same as was described for the charging apparatus of FIG. 5, and a generally conventional electromechanical timer 36. The output of active filter 101 is rectified by diode 200, to provide a rectified control output or current flowing through a relay coil 202 of a relay 204, also included in the circuit control means 22a. The relay 204 includes relay contacts 206 which are closed when the microphone 26 senses the sound of battery electrolyte gassing having a magnitude sufficient so that the rectified signal from diode 200 has a predetermined magnitude sufficient to actuate the relay coil 202.

The battery charger 38 starts to charge the battery 12a as soon as it is connected to line voltage. Initially, timer contacts 208 are closed. The closing of relay contacts 206 starts the timer 36, which maintains a full-charge state for a predetermined time to charge the battery 12a the rest of the way, and then opens timer contacts 208 so the timer is in a trickle charge state. This places the series resistor 210 in the charging circuit of the battery charger 38 and limits the charge current to a trickle charge level. Once the timer 36 is started by detection of sufficient battery electrolyte gassing and closing of relay contacts 206, the timer 36 will continue to run even if the relay contacts 206 were to reopen as a result of a momentary reduction of gassing. The power supply 212 and the battery charger 38 shown are generally conventional in nature, so that the specific components thereof are not labelled or described. Thus, the battery charging apparatus of FIG. 6 operates with a conventional timer 36 and charger 38, subject to the variable signal output of the sound transducer means or microphone 26, which responds to the sound of electrolyte gassing in the battery.

Shown in FIG. 7 is a diagrammatic view of a portion of a battery charging apparatus, generally designated 10c. The apparatus 10c includes a fluid vibration transducer, generally designated 220, which includes a lower portion immersed in electrolyte included in cell 224 of battery 226 (only partially shown). More specifically, while various arrangements could be utilized, the fluid vibration transducer 220 preferably comprises a piezoelectric element or vibration sensor 228 mounted to the inside of a battery cap 229, and a connected lower portion or probe 222 which extends into the battery electrolyte. The probe 222 moves in response to agitation caused by bubbles in the electrolyte resulting from electrolyte gassing, which occurs during battery charging as discussed above. The piezo-electric element 228 is preferably rectangular in cross-sectioned as shown. A suitable element commercially known as "Bimorph" can be utilized, and is available from Venatron Piezo-Electric Division, Department E.M., 232 Forbes Road, Bedford, Ohio. An upper edge of the element 228 is suitably cemented to the battery cap 229 and the lower edge is cemented, for example, with epoxy, to the lower portion or probe 222 which preferably comprises a plastic (PVC) rod. Electrical leads 231 are connected to the piezo-electrical element 228 and routed through a vent 230 and an aperture 232 of the battery cap 229 as illustrated. The piezo-electric element 228 and probe 222 are preferably coated with a silicon compound to protect against battery acid.

When the probe 222 moves or vibrates as a result of battery gassing and electrolyte bubbling, mechanical stress or vibration is imparted to the piezo-electric element 228 so that a variable electrical signal output or voltage appears across the leads 231. The fluid vibration transducer 220 operates to sense the magnitude of fluid vibration in the electrolyte, and thus the magntude of electrolyte gassing, so that the vibration transducer 220 can be utilized with the circuits of FIGS. 4 and 5 in a manner similar to the sound transducer or microphone 26 as previously discussed.

More particularly, when used with the circuit of FIG. 5, the output of the fluid vibration transducer is fed to active filter 101 which provides a filtered output having a predetermined frequency band or pass band centered at 1000 HZ and which corresponds generally to the central frequencies of the output of the fluid vibration transducer. The active filter 101 has sufficient gain to feed the detector 103 directly, relative to the circuit of FIG. 4, and the 1000 HZ center frequency helps reduce acoustic noise interference because these frequencies are more easily attenuated by battery cases and battery enclosures. The operation of these circuits (FIGS. 4 and 5) with the fluid vibration transducer 220 should be apparent from the explanation given above and thus need not be repeated.

FIG. 8, in addition to showing the mounting 229, diagrammatically shows how the thermistor 194 (also shown in FIG. 5) can be placed at the end of the probe 222, while the leads 231 are respectively to be connected to ground and the sensor input of the operational amplifier 107 included in the active filter 101 of the charging apparatus shown in FIG. 5.

As shown in FIGS. 7 and 8, the battery cap 229 preferably includes a vent 230, although the charging apparatus in FIGS. 4 and 5, utilizing the fluid vibration transducer 220 instead of a microphone 26, could operate if the battery were not vented.

It is to be understood that the invention is not confined to the particular construction and arrangement of parts as herein illustrated and described, but embraces all such modified forms thereof as come within the scope of the following claims.

I claim:

1. An apparatus for charging a battery including a case containing at least one cell formed of a pair of electrodes immersed in an electrolyte, said apparatus comprising sound transducer means associated with the battery for providing a variable signal output in response to sound generated within the battery case, circuit control means coupled to said signal output for providing a variable control output in response to said signal output, and charging means connected to the battery electrodes and operable for charging the battery at a rate subject to said variable control output.

2. An apparatus in accordance with claim 1 wherein said sound transducer means comprises a ceramic microphone located in communication with the battery cell.

3. An apparatus in accordance with claim 2 wherein said sound transducer means comprises a ceramic microphone located within the battery cell.

4. An apparatus in accordance with claim 3 wherein the battery case includes a battery cap having a vent in communication with the battery cell, and wherein said ceramic microphone is secured to the battery cap.

5. An apparatus in accordance with claim 1 for charging a plurality of batteries, each battery case including a vent in communication with a battery cell, said apparatus further comprising manifold means for coupling a vent of each of the plurality of batteries to said sound transducer means so that the variable signal output provided by said sound transducer means is generally in response to the sound generated within the cases of all of the plurality of batteries.

6. An apparatus in accordance with claim 5 wherein said sound transducer means comprises a ceramic microphone coupled to said manifold means and in communication with the vent of each case of the plurality of batteries.

7. An apparatus in accordance with claim 1 wherein said circuit control means comprises a timer means coupled to said variable control output and operable for maintaining a full-charge state for a predetermined time after said control output increases to a predetermined magnitude, and at the end of said predetermined time, for having a trickle charge state, and wherein said charger means is coupled to said timer means and to said battery for charging the battery at a full rate while said timer means has said full-charge state, and for charging the battery at a trickle rate in response to said timer means having said trickle charge state.

8. An apparatus in accordance with claim 1 wherein said circuit control means comprises threshold circuit means for preventing said variable control output with a magnitude below a predetermined threshold value from preventing the operation of said charging means.

9. An apparatus in accordance with claim 1 wherein said charging means comprises battery temperature detection means for preventing said charging means from charging the battery when the temperature of the battery electrolyte exceeds a predetermined upper limit.

10. An apparatus in accordance with claim 9 wherein said battery temperature detection means is normally immersed in the battery electrolyte, and is operable when not immersed in the battery electrolyte to self-heat and prevent said charging means from charging the battery.

11. An apparatus in accordance with claim 10 wherein said battery temperature detection means includes a thermistor normally immersed in the battery electrolyte.

12. An apparatus in accordance with claim 1 and further comprising enclosure means for enclosing said sound transducer means, said circuit control means, and said charging means for generally preventing ambient outside noise from interferring with the operation of said apparatus.

13. An apparatus in accordance with claim 1 wherein said circuit control means comprises active filter means coupled to said variable signal output and for providing a filtered output having a predetermined frequency band which generally corresponds to the central frequencies of the sound of the battery electrolyte gassing in response to battery charging, and detector means coupled to said filtered output and for providing the variable control output, said control output being DC and having a magnitude generally proportional to the magnitude of the sound of gassing within the battery.

14. An apparatus in accordance with claim 13 wherein said charging means comprises phase control means for charging the battery at a decreasing rate in response to the magnitude of said variable control output increasing.

15. An apparatus in accordance with claim 14 wherein said phase control means includes terminals adapted for connection to the battery and is operable for preventing a voltage from appearing across said terminals when the battery is not connected to said terminals.

16. An apparatus in accordance with claim 12 wherein said charging means comprises power transformer and rectifier means having a DC power output, pulse shaper means coupled to said DC power output, ramp generator means coupled to said pulse shaper means, comparator means having two inputs, with one input coupled to said variable control output and the other input coupled to said ramp generator means, and having an output, and switch means subject to said comparator output for connecting said DC power output to said battery electrodes to effect charging of the battery.

17. An apparatus in accordance with claim 16 wherein said circuit control means further comprises threshold means coupled between said detector means and one of the inputs of said comparator means for preventing said variable control output with a magnitude below a predetermined threshold value from preventing the operation of said charging means.

18. An apparatus in accordance with claim 16 wherein said charging means further comprises battery temperature detection means coupled to said pulse shaper means for preventing said charging means from charging the battery when the temperature of the battery electrolyte exceeds a predetermined upper limit.

19. An apparatus in accordance with claim 18 wherein said battery temperature detection means is normally immersed in the battery electrolyte, and is operable when not immersed in the battery electrolyte to self-heat and prevent said charging means from charging the battery.

20. An apparatus in accordance with claim 19 wherein said battery temperature detection means includes a thermistor normally immersed in the battery electrolyte.

21. An apparatus for charging a battery including a case containing at least one cell formed of a pair of electrodes immersed in an electrolyte, said apparatus comprising fluid vibration transducer means associated with the battery for providing a variable signal output in response to fluid vibration in the battery electrolyte, circuit control means coupled to said signal output for providing a variable control output in response to said signal output, and charging means connected to the battery electrodes and coupled to said control output for supplying charging current to the battery subject to said control output.

22. An apparatus in accordance with claim 21 wherein said fluid vibration transducer means comprises a piezo-electric element.

23. An apparatus in accordance with claim 22 wherein said fluid vibration transducer means further comprises probe means connected to said piezo-electric element and extending into the battery electrolyte for imparting a mechanical stress on said piezo-electric element when the electrolyte gasses and bubbles as a result of battery charging.

24. An apparatus in accordance with claim 23 wherein the battery includes a battery cap and wherein said piezo-electric element is connected to said battery cap.

25. An apparatus in accordance with claim 21 wherein said circuit control means comprises a timer means coupled to said variable control output and operable for maintaining a full-charge state for a predetermined time after said control output increases to a predetermined magnitude, and at the end of said predetermined time, for having a trickle charge state, and wherein said charger means is coupled to said timer means and to said battery for charging the battery at a full rate while said timer means has said full-charge state, and for charging the battery at a trickle rate in response to said timer means having said trickle charge state.

26. An apparatus in accordance with claim 21 wherein said circuit control means comprises threshold circuit means for preventing said variable control output with a magnitude below a predetermined threshold value from preventing the operation of said charging means.

27. An apparatus in accordance with claim 21 wherein said charging means comprises battery temperature detection means for preventing said charging means from charging the battery when the temperature of the battery electrolyte exceeds a predetermined upper limit.

28. An apparatus in accordance with claim 27 wherein said battery temperature detection means is normally immersed in the battery electrolyte, and is operable when not immersed in the battery electrolyte to self-heat and prevent said charging means from charging the battery.

29. An apparatus in accordance with claim 28 wherein said battery temperature detection means includes a thermistor normally immersed in the battery electrolyte.

30. An apparatus in accordance with claim 21 wherein said circuit control means comprises active filter means coupled to said variable signal output and for providing a filtered output having a predetermined frequency band which generally corresponds to the central frequencies of the output of the fluid vibration transducer means resulting from electrolyte gassing in response to battery charging, and detector means coupled to said filtered output and for providing the variable control output, said control output being DC and having a magnitude generally proportional to the magnitude of electrolyte gassing within the battery.

31. An apparatus in accordance with claim 30 wherein said charging means comprises phase control means for charging the battery at a decreasing rate in response to the magnitude of said variable control output increasing.

32. An apparatus in accordance with claim 31 wherein said phase control means includes terminals adapted for connection to the battery and is operable for preventing a voltage from appearing across said terminals when the battery is not connected to said terminals.

33. An apparatus in accordance with claim 30 wherein said charging means comprises power transformer and rectifier means having a DC power output, pulse shaper means coupled to said DC power output, ramp generator means coupled to said pulse shaper means, comparator means having two inputs, with one input coupled to said variable control output and the other input coupled to said ramp generator means, and having an output, and switch means subject to said comparator output for connecting said DC power output to said battery electrodes to effect charging of the battery.

34. An apparatus in accordance with claim 33 wherein said circuit control means further comprises threshold means coupled between said detector means and one of the inputs of said comparator means for preventing said variable control output with a magnitude below a predetermined threshold value from preventing the operation of said charging means.

35. An apparatus in accordance with claim 33 wherein said charging means further comprises battery temperature detection means coupled to said pulse shaper means for preventing said charging means from charging the battery when the temperature of the battery electrolyte exceeds a predetermined upper limit.

36. An apparatus in accordance with claim 35 wherein said battery temperature detection means is normally immersed in the battery electrolyte, and is operable when not immersed in the battery electrolyte to self-heat and prevent said charging means from charging the battery.

37. An apparatus in accordance with claim 36 wherein said battery temperature detection means includes a thermistor normally immersed in the battery electrolyte.

* * * * *